(12) United States Patent
Kobayashi et al.

(10) Patent No.: US 8,493,504 B2
(45) Date of Patent: Jul. 23, 2013

(54) CAMERA MODULE

(75) Inventors: Masaru Kobayashi, Saitama-ken (JP); Tatsuhiko Hagihara, Saitama-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 212 days.

(21) Appl. No.: 13/009,184

(22) Filed: Jan. 19, 2011

(65) Prior Publication Data

US 2011/0234890 A1   Sep. 29, 2011

(30) Foreign Application Priority Data

Mar. 24, 2010 (JP) ................................. 2010-068359

(51) Int. Cl.
| | |
|---|---|
| H04N 5/225 | (2006.01) |
| H04N 3/14 | (2006.01) |
| G02B 7/04 | (2006.01) |
| G03B 17/00 | (2006.01) |
| G03B 17/02 | (2006.01) |
| H01L 31/0232 | (2006.01) |
| H01L 27/00 | (2006.01) |

(52) U.S. Cl.
USPC ........... 348/373; 348/340; 348/374; 348/294; 396/144; 396/529; 396/535; 257/432; 250/208.1

(58) Field of Classification Search
USPC .......... 348/373–376, 294, 335, 340; 396/529, 396/530, 55, 133, 144, 535; 250/208.1, 239; 257/432–434, 680
See application file for complete search history.

(56) References Cited

U.S. PATENT DOCUMENTS

| | | | | |
|---|---|---|---|---|
| 5,673,083 | A | * | 9/1997 | Izumi et al. .................... 348/340 |
| 2007/0031137 | A1 | * | 2/2007 | Bogdan et al. ................. 396/114 |
| 2008/0119080 | A1 | * | 5/2008 | Wu ................................ 439/331 |
| 2008/0252774 | A1 | * | 10/2008 | Chen et al. ...................... 348/374 |

FOREIGN PATENT DOCUMENTS

| | | | | |
|---|---|---|---|---|
| JP | 2007-043628 | * | 2/2007 | .................... 348/373 |
| JP | 2009-253363 | | 10/2009 | |

OTHER PUBLICATIONS

U.S. Appl. No. 12/836,159, filed Jul. 14, 2010, Masaru Kobayashi, et al.

* cited by examiner

*Primary Examiner* — Nhan T Tran
*Assistant Examiner* — Marly Camargo
(74) *Attorney, Agent, or Firm* — Oblon, Spivak, McClelland, Maier & Neustadt, L.L.P.

(57) ABSTRACT

A camera module according to one embodiment of this invention has a sensor substrate, a lens holder, and a shield being fixed to the lens holder. The lens holder is composed of a tubular portion including a lens and a top board having an opening. The lens holder is fixed by a second adhesive provided more inside than an edge of the sensor substrate. The shield has a tubular portion and a top board. The tubular portion is composed of a small-diameter portion, a step portion, and a large-diameter portion. The shield is disposed so that the step portion is in contact with a portion between the edge of the sensor substrate and the second adhesive, and, at the same time, the top board of the lens holder is located in an opening formed in the top board of the shield.

17 Claims, 4 Drawing Sheets

CAMERA MODULE

CROSS REFERENCE TO RELATED APPLICATIONS

This application is based upon and claims the benefit of priority from the prior Japanese Patent Application No. 2010-068359 filed in Japan on Mar. 24, 2010; the entire contents of which are incorporated herein by reference.

FIELD

Embodiments described herein relate generally to a camera module.

BACKGROUND

The prior art camera module is composed of a sensor substrate, a lens holder disposed on the sensor substrate, and a bottomed cylindrical light cutoff shield covering the sensor substrate and the lens holder.

The sensor substrate has on its rear surface a solder ball to be electrically connected to a mounting substrate. The lens holder includes a lens within it.

The light cutoff shield is adhered to a lens holder in such a state that a bottom portion of the light cutoff shield is disposed on the rear surface side of the sensor substrate. The light cutoff shield serves as a magnetic shield.

In the prior art camera module, the upper portion of the lens holder is not covered by the light cutoff shield. Accordingly, there is a problem that the prior art camera module cannot shield electromagnetic waves irradiated from above.

In order to solve the above problem, there is considered a method of vaporizing metal for shielding electromagnetic waves (applying shield coating) on an upper surface of the lens holder exposed from the light cutoff shield. However, in general, the shield coating by vaporization increases the cost. The vaporized metal should be formed so as to be grounded, whereby the cost is further increased.

As another method for solving the above problem, there is considered a method of adhering the light cutoff shield to the lens holder so that the bottom portion of the light cutoff shield is disposed on the upper surface side of the lens holder. However, when the light cutoff shield is disposed thus, there is a problem that the reliability of the camera module is deteriorated.

Namely, the vertical direction position of the lens holder is varied by the focus adjustment of the lens. Accompanying this, the vertical direction position of the light cutoff shield adhered to the lens holder also varies. The variation of the position of the light cutoff shield causes deterioration of the flatness of a surface formed by a lower end portion of the light cutoff shield and a lower end portion of the solder ball of the sensor substrate. Accordingly, when the camera module is mounted on the mounting substrate, in a certain case, only the light cutoff shield is in contact with the mounting substrate, and the solder ball is not in contact with a wiring on the mounting substrate. Alternatively, in another case, only the solder ball is in contact with the wiring on the mounting substrate, and the light cutoff shield is not in contact with the mounting substrate, so that the light cutoff shield is not operated as a magnetic shield. When the flatness of the surface formed by the lower end portion of the light cutoff shield and the lower end portion of the solder ball is deteriorated, the reliability of the camera module is deteriorated.

DETAILED DESCRIPTION

A camera module according to one embodiment of this invention is provided with a sensor substrate, a lens holder being fixed onto the sensor substrate, and a shield being fixed to the lens holder. The sensor substrate has a sensor part and has on its rear surface an external electrode electrically connected to the sensor part. The lens holder is composed of a tubular portion and a top board provided at the upper end of the tubular portion. The tubular portion of the lens holder is fixed by an adhesive provided more inside than the edge of the front surface of the sensor substrate and includes a lens. The top board of the lens holder has an opening. The shield is composed of a tubular portion and a top board provided at the upper end of the tubular portion. The tubular portion of the shield is composed of a small-diameter portion, a step portion provided at a lower end of the small-diameter portion, and a large-diameter portion provided at a lower surface of the step portion. The top board of the shield has an opening. In this shield, the step portion is in contact with a portion between the edge and the adhesive of the front surface of the sensor substrate, and the top board of the shield is disposed so that the top board of the lens holder is located in the opening of the top board of the shield.

Hereinafter, a camera module according to each embodiment of this invention will be described in detail with reference to the drawings. The camera modules described hereinafter are CSCMs (Chip Scale Camera Modules).

First Embodiment

Figure 1:
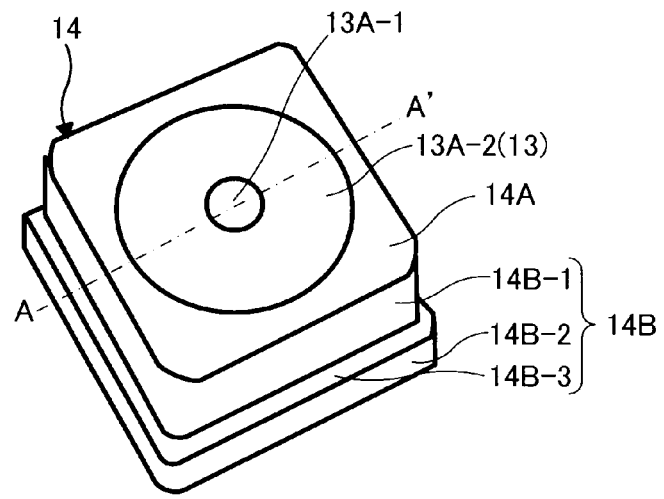
FIG. 1 is a perspective view showing a camera module according to a first embodiment.
Figure 2:
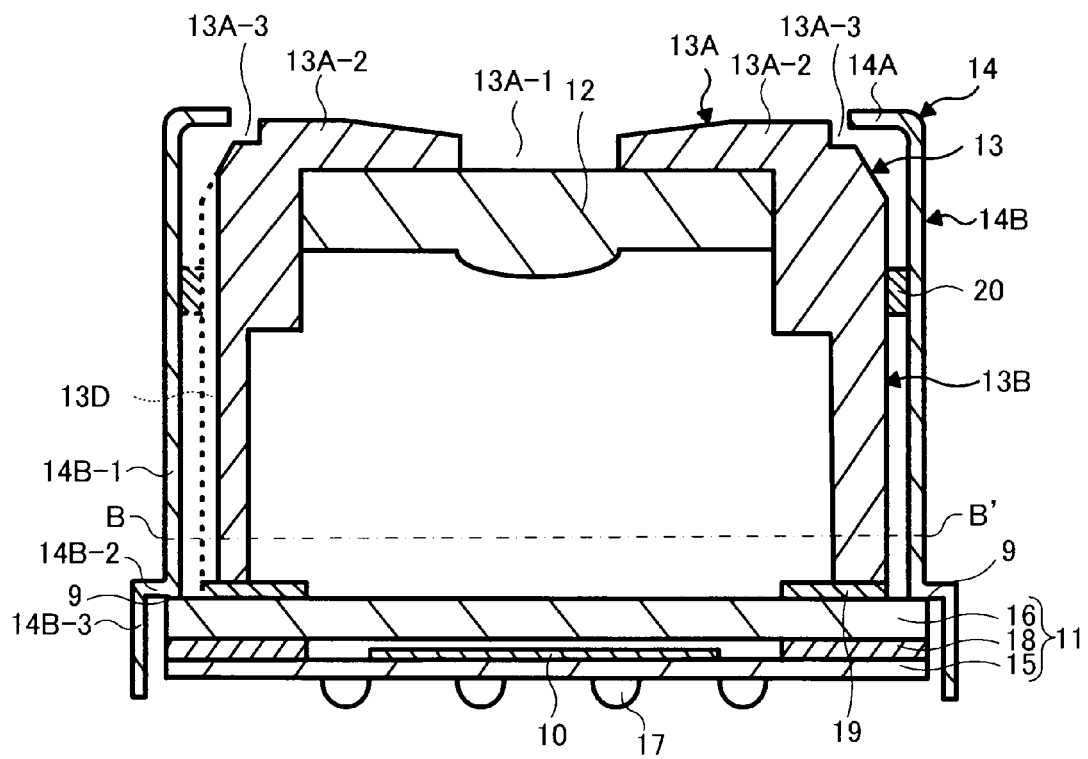
FIG. 2 is a cross-sectional view of the camera module along a dashed line A-A' in FIG. 1.

FIG. 1 is a perspective view showing a camera module of the present embodiment. FIG. 2 is a cross-sectional view of the camera module along a dashed line A-A' in FIG. 1. As shown in FIG. 1, in the camera module of the present embodiment, a sensor substrate 11 (FIG. 2) and a lens holder 13 including a lens 12 are covered by a tubular shield 14 having a top board.

As shown in FIG. 2, the sensor substrate 11 has a substantially square silicon substrate 15 and a substantially square support substrate 16. The support substrate 16 is fixed onto the silicon substrate 15.

The silicon substrate 15 has on its upper surface an insulating film (not shown). A sensor part 10 is provided at the central portion of the upper surface of the silicon substrate 15 through the insulating film (not shown). The sensor part 10 has a plurality of imaging devices arranged in a lattice form. The sensor part 10 receives the light collected by the lens 12 and generates a photoelectric current according to the amount of the received light. Each of the imaging devices (not shown) has a laminate structure including a photodiode, a color filter, and a micro lens.

The silicon substrate 15 has a plurality of through-holes (not shown) penetrating through the silicon substrate 15. The through-holes each include a penetration electrode. The penetration electrode electrically connects the photodiode and a wiring pattern (not shown) provided on rear surface of the silicon substrate 15.

The silicon substrate 15 has on its rear surface the wiring pattern (not shown) electrically connected to the penetration electrode. The wiring pattern, except for some portions, is covered by a wiring protection film (not shown) formed of a solder resist film, for example.

The wiring pattern on the rear surface of the silicon substrate 15 is exposed in a lattice form from the wiring protection film (not shown). The exposed portions have a plurality of external electrodes 17 for mounting the camera module on a mounting substrate (not shown). The external electrodes 17 are each composed of a solder ball, for example.

The support substrate 16 formed of a glass substrate, for example, is fixed onto the silicon substrate 15. The silicon substrate 15 is formed so as to be reduced in thickness by, for example, being polished from the lower surface. And then the penetration electrodes are formed on the silicon substrate 15. At that time, the support substrate 16 supports the silicon substrate 15.

The support substrate 16 is fixed onto the silicon substrate 15 by a first adhesive 18 formed annularly so as to surround the sensor part 10, for example.

A second adhesive 19 for disposing and fixing the lens holder 13 on the sensor substrate 11 is coated or formed on the front surface of the sensor substrate (the support substrate 16). Since the diameter of the lens holder 13 is smaller than the diameter of the sensor substrate 11, the second adhesive 19 is annularly coated or formed more inside than an edge 9 of the support substrate 16.

The lens holder 13 is composed of a tubular portion 13B and a top board 13A provided at the upper end of the tubular portion 13B and is formed of, for example, a resin. The lens holder 13 has a structure that the peripheral portion of the top board 13A and the upper portion of the tubular portion 13B are partially chamfered along the outer circumference of the lens holder 13.

The lens holder 13 is fixed onto the sensor substrate 11 by the second adhesive 19 between the lower end portion of the lens holder 13 (an open end portion of the tubular portion 13B, which faces the top board 13A) and the sensor substrate 11.

The lens holder 13 includes the lens 12 within it. The lens 12 is formed of a resin, for example and in contact with the top board 13A of the lens holder 13, and, at the same time, is provided so as to bury partially the tubular portion 13B of the lens holder 13. A portion of the surface of the lens 12, which is located below an opening 13A-1 provided in the top board 13A of the lens holder 13, is formed in a convex shape. The light entering from the opening 13A-1 is collected to the sensor part on the silicon substrate 15 through a protrusion 13A-2.

The lens holder 13 may include an infrared ray cut filter.

The lens holder 13 is fixed onto the sensor substrate 11 so that a focal point of the lens 12 matches the sensor part 10 of the sensor substrate (the lens 12 is focused). The focus position of the lens 12 is adjusted by the thickness of the second adhesive 19.

Figure 3:
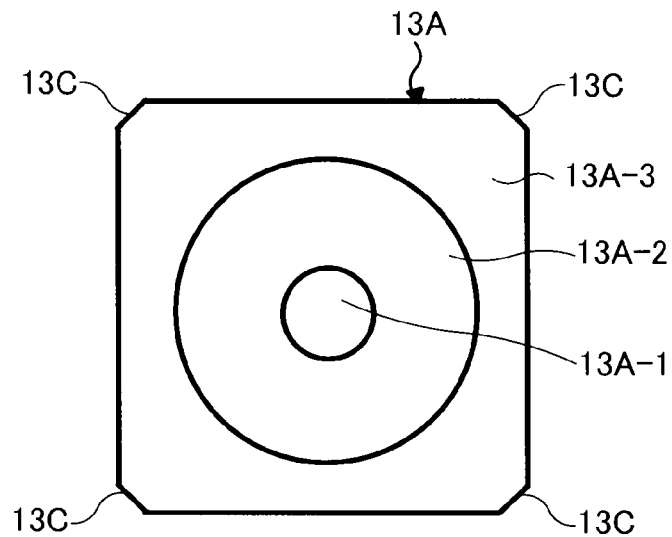
FIG. 3 is a top view of a lens holder shown in FIG. 2.
Figure 4:
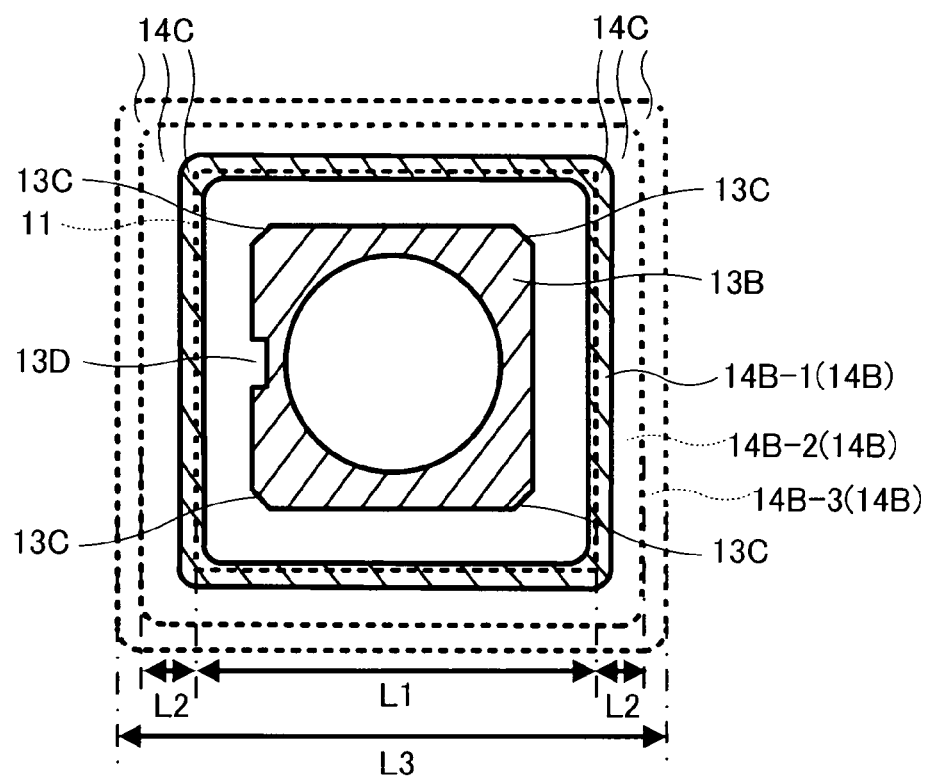
FIG. 4 is a cross-sectional view of the camera module along a dashed line B-B' in FIG. 2.

The shape of the lens holder 13 will be described in more detail with reference to FIGS. 2, 3, and 4. FIG. 3 is a top view of the lens holder 13. FIG. 4 is a cross-sectional view of the camera module along a dashed line B-B' in FIG. 2.

The top board 13A of the lens holder 13 shown in FIG. 2 has a substantially quadrangular shape, as shown in FIG. 3. However, each corner of the quadrangle has a chamfer portion 13C formed by removing the corner in a planar manner. The chamfer portion 13C is formed extending over the entire lens holder 13 including the tubular portion 13B of the lens holder 13.

The top board 13A has a cut-out portion 13A-3 provided at the peripheral portion so that the thickness of the top board 13A is smaller than the thickness of a substantially circular central portion 13A-2 having the opening 13A-1 at the center. The cut-out portion 13A-3 is provided for preventing the lens holder 13 from being in contact with a shield 14 to be described later in the adjustment of the focus position of the lens holder 13.

Namely, the position of the lens holder 13 varies in the vertical direction when the focus position is adjusted. Accordingly, the lens holder 13 may be in contact with the shield 14 depending on the focus position. However, as described above, when the lens holder 13 has the cut-off portions 13A-3, a fixed gap is vertically formed between the lens holder 13 and the shield 14. Consequently, even if the position of the lens holder 13 varies in the vertical direction, the lens holder 13 is prevented from being in contact with the shield 14.

The central portion 13A-2 of the top board 13A is formed so as to be gradually reduced in thickness from the peripheral portion to the opening 13A-1, as shown in FIG. 2. Namely, the central portion 13A-2 of the top board 13A is formed so that the thickness of the peripheral portion is large and the thickness near the opening 13A-1 is small. This shape causes the mechanical strength of the top board 13A to increase while keeping the vertical length of the opening 13A-1 at a desired distance.

The tubular portion 13B of the lens holder 13 shown in FIG. 2 has a shape that a substantially cylindrical opening is provided along the center axis of a substantially quadrangular prism-shaped resin. Accordingly, the tubular portion 13B of the lens holder 13 has a frame-shaped cross section, as shown in FIG. 4. The outer periphery of the frame has a substantially quadrangular shape corresponding to the shape of the top board 13A of the lens holder 13, and the inner periphery has a substantially circular shape. In the frame-shaped cross section, each corner of the outer periphery (the corners correspond to the ridge line of the tubular portion 13B of the lens holder 13) of the frame has the chamfer portion 13C formed extending from the top board 13A, as described above.

As shown in FIG. 4, the outer periphery of the tubular portion 13B of the lens holder 13 has in part a recess 13D provided along the vertical direction of the lens holder 13. The recess 13D is formed for preventing a burr, formed in the formation of the lens holder 13, from being protruded from the outer periphery of the lens holder 13. Namely, the lens holder 13 is formed by injecting a resin through an inlet of a mold with a desired shape. The burr formed of the resin staying in the inlet of the mold is formed on the outer periphery of the lens holder 13 formed thus. In the lens holder 13 of the present embodiment, a portion where the burr is formed is previously formed into a concave shape, whereby the formed burr is prevented from being protruded from the outer periphery of the lens holder 13.

The lens holder 13 and the sensor substrate 11 are covered by the tubular shield 14 having a top board, as shown in FIGS. 1 and 2. The shield 14 is formed of brass or stainless, for example. The shield 14 has a light-shielding function, and, at the same time, is grounded to be described later, and therefore, the shield 14 is also operated as a electromagnetic shield.

The top board 14A of the shield 14 has a substantially quadrangular shape and has an opening at the center. A tubular portion 14B of the shield 14 having the top board 14A at the upper end has a shape that a substantially quadrangular prism-shaped opening is provided along the center axis of a substantially quadrangular prism-shaped metal. The portions corresponding to four ridge lines of the tubular portion 14B of the shield 14 each have a curved portion 14C curving in an arc at an angle R.

The tubular portion 14B of the shield 14 is composed of a small-diameter portion 14B-1, a step portion 14B-2, and a large-diameter portion 14B-3, as shown in FIG. 2. The step portion 14B-2 is provided at the lower end of the small-diameter portion 14B-1. The large-diameter portion 14B-3 is provided at the lower end of the step portion 14B-2. The small-diameter portion 14B-1, the step portion 14B-2, and the large-diameter portion 14B-3 are integrally formed, including the top board 14A of the shield 14. The large-diameter portion 14B-3 of the shield 14 means a portion of the shield 14 where the outer diameter is large. The small-diameter portion 14B-1 of the shield 14 means a portion of the shield 14 where the outer diameter is small. The outer diameter means a length of one side of a quadrangle which is the horizontal cross-sectional shape of the shield 14.

In the shield 14, the height of the large-diameter portion 14B-3 is substantially equal to the distance from the front surface of the sensor substrate 11 to a lower end portion of the external electrode 17.

The shield 14 is disposed so that the central portion 13A-2 of the top board 13A of the lens holder 13 is located inside the opening of the top board 14A. In the shield 14, the small-diameter portion 14B-1 is fitted into the lens holder 13, and the large-diameter portion 14B-3 is fitted into the sensor substrate 11. At the same time, the step portion 14B-2 is disposed between the edge 9 and the second adhesive 19 of the front surface of the sensor substrate 11 (the front surface of the support substrate 16) so as to be in contact with the entire edge 9.

Next, the relationship in size between the shield 14 and the sensor substrate 11 will be described in more detail with reference to FIG. 4. As shown in FIG. 4, the sensor substrate 11 has a quadrangular shape whose one side has a length L1 of 3.6 mm, for example. Meanwhile, the tubular portion 14B of the shield 14 has a frame shape with a thickness of approximately 0.1 mm, for example, and the outer and inner peripheries of the frame each have a substantially quadrangular shape. The inner periphery of the small-diameter portion 14B-1 is formed to have a substantially quadrangular shape in which the length of one side is slightly smaller than the length L1 of one side of the sensor substrate 11. According to this constitution, the step portion 14B-2 of the shield 14 is in contact with the portion between the edge of the sensor substrate 11 and the second adhesive 19.

The inner periphery of the small-diameter portion 14B-1 is formed into a substantially quadrangular shape spaced from the sensor substrate 11 at a fixed interval L2 of approximately 0.1 mm, for example. The outer periphery of the small-diameter portion 14B-1 is formed into a substantially quadrangular shape whose one side has a length L3 of 4.0 mm, for example.

The shield 14 is fixed to the lens holder 13 through a third adhesive 20 is coated or formed at a portion of the outer periphery of the lens holder 13 along the outer circumference of the lens holder 13.

Figure 5:
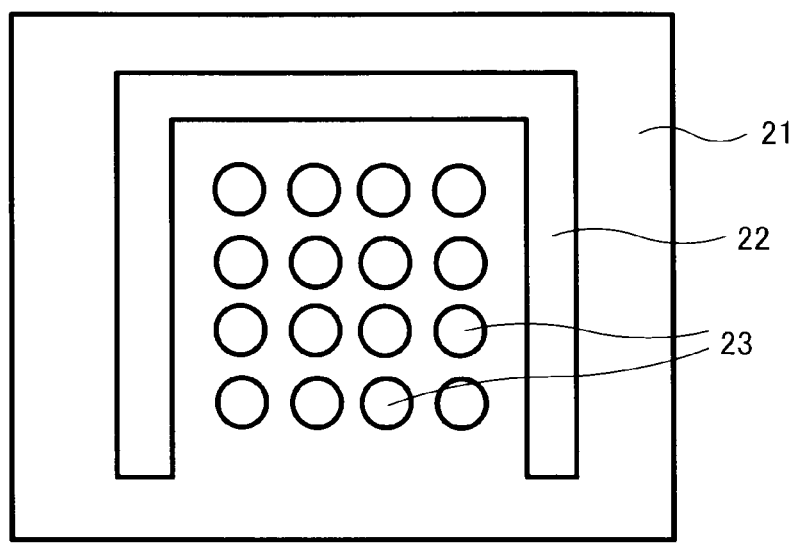
FIG. 5 is a top view showing a relevant portion of a mounting substrate.

The camera module of the present embodiment is mounted on a mounting substrate 21 shown in FIG. 5. FIG. 5 is a top view showing a relevant portion of the mounting substrate 21. As shown in FIG. 5, a U-shaped grounding wire 22 for a shield 14 is mounted on the mounting substrate 21. The grounding wire 22 is used for grounding the shield 14. The grounding wire 22 partially surrounds a plurality of wires 23 for a camera module formed in a lattice pattern so that the wires 23 are spaced from each other. The wires 23 are used for supplying power to a camera module, inputting and outputting signals, or grounding.

A solder paste (not shown) is previously coated on each of the wires 22 and 23 on the surface of the mounting substrate 21. When the camera module is mounted on the mounting substrate 21, the camera module is disposed so that each of the external electrodes 17 is in contact with the wire 23 for a camera module, and then a lower end portion of the shield 14 (an open end portion of the tubular portion 14B, which faces the top board 14A) is in contact with the grounding wire 22 for a shield. Thereafter, a reflow processing is performed, whereby the camera module is mounted on the mounting substrate 21.

According to the camera module described above, the entire lens holder 13 other than the central portion 13A-2 of the top board 13A is covered by the shield 14. Consequently, the effect of shielding electromagnetic waves can be enhanced.

Since the lens holder 13 is not required to be subjected to shield coating, the manufacturing cost is not increased.

In the camera module of the present embodiment, the step portion 14B-2 of the shield 14 is brought into contact with the front surface of the sensor substrate 11 (the front surface of the support substrate 16), whereby the vertical direction position of the shield 14 is determined. Accordingly, the flatness of the surface formed by the lower end portions of the external electrodes 17 of the sensor substrate 11 and the lower end portion of the shield 14 is not deteriorated due to the focus position of the lens holder 13. According to this constitution, the reliability of the camera module is not reduced.

Second Embodiment

Figure 6:
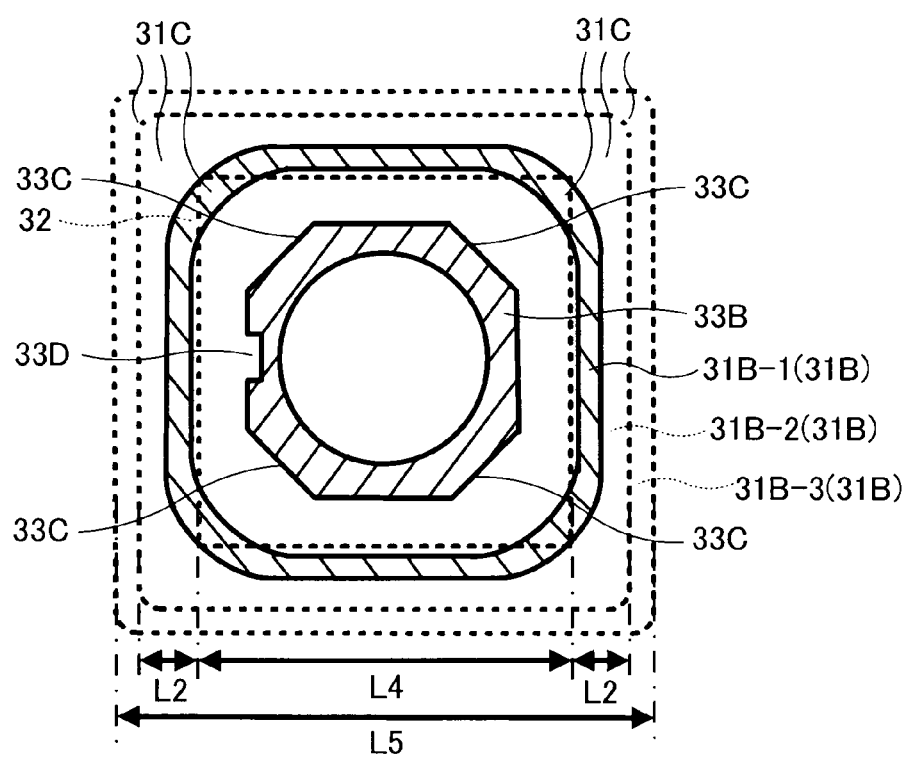
FIG. 6 is a cross-sectional view of a camera module according to a second embodiment and corresponds to FIG. 4.

FIG. 6 is a cross-sectional view of a camera module according to a second embodiment and corresponds to FIG. 4. The camera module according to the second embodiment is different from the camera module according to the first embodiment in that a step portion 31B-2 of a shield 31 is in contact with only four corners of a sensor substrate 32. Hereinafter, the shield of the camera module according to the second embodiment will be described. In FIG. 6, the components similar to those in FIG. 4 are assigned the same reference numerals as those in FIG. 4.

As shown in FIG. 6, a tubular portion 33B of a lens holder 33 has the same structure as the tubular portion 13B of the lens holder 13 of the camera module of the first embodiment except that the tubular portion 33B has chamfer portions 33C. However, the area of the chamfer portion 33C is enlarged larger than the area of the chamfer portion 13C of the tubular portion 13B of the lens holder 13 of the camera module of the first embodiment, and this point is different from the first embodiment. According to this constitution, the cross-sectional shape of the lens holder 33 is a frame shape whose outer periphery has a substantially octagon shape and inner periphery has a substantially circular shape.

In comparison with the sensor substrate 11 of the camera module according to the first embodiment, the sensor substrate 32 is reduced in size.

Further, in comparison with the sensor substrate 11 of the camera module according to the first embodiment, the angle R of a curved portion 31C of a small-diameter portion 31B-1 of the shield 31 is increased. Since the angle R of the curved portion 31C is increased, even if the sensor substrate 32 is reduced in size as described above, the step portion 31B-2 of the shield 31 can be brought into contact with only the four corners of the sensor substrate 32. The angle R of the curved portion 31C of the small-diameter portion 31B-1 may have a magnitude that allows the step portion 31B-2 of the shield 31 to be in contact with only the four corners of the sensor substrate 32.

The relationship in size between the shield 31 and the sensor substrate 32 is shown as follows. Namely, the sensor substrate 32 has a quadrangular shape whose one side has a length L4 of 3.2 mm, for example. A tubular portion 31B of the shield 31 has a frame shape with a thickness of approximately 0.1 mm, for example, and the outer and inner peripheries of the frame each have a substantially quadrangular shape. The inner periphery of the small-diameter portion 31B-1 is formed to have a substantially quadrangular shape in which the length of one side is slightly larger than the length L4 of one side of the sensor substrate 32. The angles R of the inner and outer peripheries of the curved portion 31C are formed larger than the shield 14 according to the first embodiment to such an extent that the step portion 31B-2 of the shield 31 is in contact with only the four corners of the sensor substrate 32.

As in the camera module according to the first embodiment, the inner periphery of a large-diameter portion 31B-3 is formed into a substantially quadrangular shape spaced from the sensor substrate 32 at a fixed interval L2 of approximately 0.1 mm, for example. Accordingly, the outer periphery of the large-diameter portion 31B-3 is smaller than the large-diameter portion 14B-3 of the shield 14 of the camera module according to the first embodiment and is formed into a substantially quadrangular shape whose one side has a length L5 of approximately 3.6 mm, for example.

Even in the camera module, for the reason in the camera module according to the first embodiment, the effect of shielding electromagnetic waves can be enhanced without increasing the manufacturing cost and reducing the reliability.

In the camera module according to the second embodiment, the sensor substrate 32 is reduced in size. Accordingly, the large-diameter portion 31B-3 of the tubular portion 31B of the shield 31 is reduced in size smaller than the large-diameter portion 14B-3 of the shield 14 of the camera module according to the first embodiment. Consequently, according to the camera module, the camera module can be further reduced in size.

Third Embodiment

Figure 7:
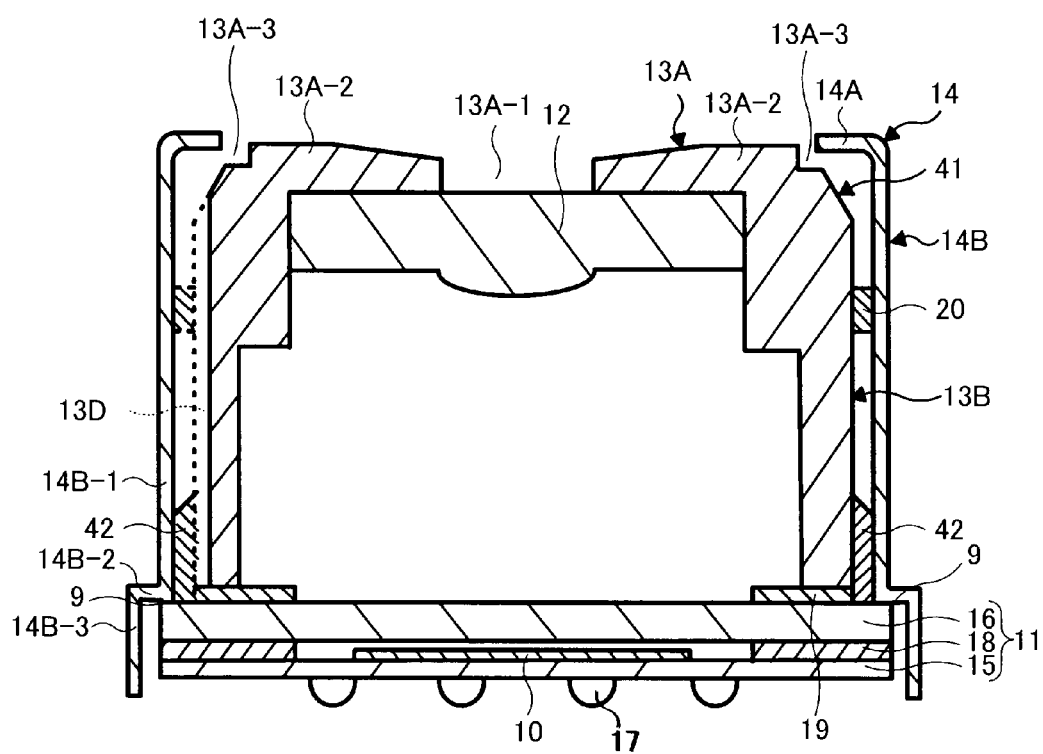
FIG. 7 is a cross-sectional view of a camera module according to a third embodiment and corresponds to FIG. 2.

FIG. 7 is a cross-sectional view of a camera module according to a third embodiment and corresponds to FIG. 2. The camera module according to the third embodiment is different from the camera module according to the first embodiment in the shape of a lens holder 41. Hereinafter, the camera module according to the third embodiment will be described. In FIG. 7, the components similar to those in FIG. 2 are assigned the same reference numerals as those in FIG. 2.

As shown in FIG. 7, the lens holder 41 has a flange portion 42 provided around a portion of the outer surface of a tubular portion 41B of the lens holder 41, and this point is different from the first embodiment. Namely, the outer diameter of the portion of the tubular portion 41B of the lens holder 41 is enlarged, and this point is different from the first embodiment. The outer diameter of the flange portion 42 substantially corresponds to the inner diameter of the small-diameter portion 14B-1 of the shield 14.

Even in the camera module, for the reason in the camera module according to the first embodiment, the electromagnetic shielding effect can be enhanced without increasing the manufacturing cost and reducing the reliability.

The flange portion 42 is provided around the portion of the outer surface of the tubular portion 41B of the lens holder 41, whereby the positional accuracy in the horizontal direction of the shield 19 can be enhanced. Consequently, the shield 14 is removed from the sensor substrate 11 without the step portion 14B-2 of the shield 14 being in contact with the sensor substrate 11, and the shield 14 is prevented from being disposed obliquely to the sensor substrate 11. When the shield 14 is disposed obliquely to the sensor substrate 11, the flatness of the surface formed by the lower end portion of the shield 14 and the lower end portions of the plurality of external electrodes 17 of the sensor substrate 11 is deteriorated. Accordingly, the reliability of the camera module is reduced. However, according to the camera module of the third embodiment, the reduction in reliability can be suppressed.

The lens holder 41 according to the third embodiment may be applied to the camera module according to the second embodiment.

While certain embodiments have been described, these embodiments have been presented by way of example only, and are not intended to limit the scope of the inventions. Indeed, the camera modules described herein may be embodied in a variety of other forms: furthermore, various omissions, substitutions and changes in the form of the camera modules described herein may be made without departing from the spirit of the inventions. The accompanying claims and their equivalents are intended to cover such forms or modifications as would fall within the scope and spirit of the inventions.

For example, the sensor substrate may have such a structure that the sensor part is placed on a portion on a substrate such as a silicon substrate and the support substrate 16 is not provided. The sensor substrate may be composed of only the sensor part. Also in the camera module having such a sensor substrate, as in the above embodiments, the shields 14 and 31 may be disposed so that the step portions 14B-2 and 31B-2 are in contact with the sensor substrate.

What is claimed is:

1. A camera module, comprising:
   a sensor substrate having a sensor part and having on its rear surface an external electrode electrically connected to the sensor part;
   a lens holder being fixed by an adhesive provided more inside than an edge of a front surface of the sensor substrate and having a tubular portion including a lens and a top board having an opening provided at an upper end of the tubular portion; and
   a shield being fixed to the lens holder and having a tubular portion composed of a small-diameter portion, a step portion provided at a lower end of the small-diameter portion, and a large-diameter portion provided on a lower surface of the step portion and a top board having an opening provided at an upper end of the tubular portion,
   wherein the step portion of the shield is in contact with the front surface of the sensor substrate between the edge of the sensor substrate and a portion in which the adhesive on the sensor substrate is provided, and, at the same time, the top board of the shield is disposed so that the top board of the lens holder is located in the opening of the top board of the shield,
   wherein a fixed gap is vertically formed between the lens holder and the shield.

2. The camera module according to claim 1, wherein the step portion of the shield is in contact with the entire edge of the sensor substrate.

3. The camera module according to claim 1, wherein a diameter of the lens holder is smaller than a diameter of the sensor substrate.

4. The camera module according to claim 1, wherein a flange portion is provided around an outer surface of the lens holder.

5. The camera module according to claim 1, wherein a height of the large-diameter portion of the shield is substantially equal to a distance from the front surface of the sensor substrate to a lower end portion of the external electrode.

6. The camera module according to claim 1, wherein the top board of the lens holder has a cut-out portion at the peripheral portion.

7. The camera module according to claim 1, wherein the lens holder has a recess provided at a portion of the outer periphery along the vertical direction of the lens holder.

8. The camera module according to claim 1, wherein a horizontal cross-sectional shape of the lens holder is a frame shape composed of a substantially quadrangular outer periphery and a substantially circular inner periphery, and each corner of the outer periphery has a chamfer portion.

9. The camera module according to claim 2, wherein the sensor substrate is composed of a silicon substrate having on its front surface a sensor part, and, at the same time, having on its rear surface an external electrode electrically connected to the sensor part, an adhesive annularly provided on the silicon substrate so as to surround the sensor part, and a support substrate fixed onto the silicon substrate through the adhesive.

10. The camera module according to claim 1, wherein the horizontal cross-sectional shape of the tubular portion of the shield is a substantially quadrangular frame shape having curved portions provided respectively at four corners of the frame shape, and the step portion of the shield is in contact with only four corners of the sensor substrate.

11. The camera module according to claim 10, wherein a diameter of the lens holder is smaller than a diameter of the sensor substrate.

12. The camera module according to claim 10, wherein a flange portion is provided around an outer surface of the lens holder.

13. The camera module according to claim 10, wherein a height of the large-diameter portion of the shield is substantially equal to a distance from the front surface of the sensor substrate to a lower end portion of the external electrode.

14. The camera module according to claim 10, wherein the top board of the lens holder has a cut-out portion at the peripheral portion.

15. The camera module according to claim 10, wherein the lens holder has a recess provided at a portion of the outer periphery along the vertical direction of the lens holder.

16. The camera module according to claim 10, wherein a horizontal cross-sectional shape of the lens holder is a frame shape composed of a substantially quadrangular outer periphery and a substantially circular inner periphery, and each corner of the outer periphery has a chamfer portion.

17. The camera module according to claim 10, wherein the sensor substrate is composed of a silicon substrate having on its front surface a sensor part, and, at the same time, having on its rear surface an external electrode electrically connected to the sensor part, an adhesive annularly provided on the silicon substrate so as to surround the sensor part, and a support substrate fixed onto the silicon substrate through the adhesive.

* * * * *